United States Patent [19]
Lang

[11] Patent Number: 5,995,705
[45] Date of Patent: *Nov. 30, 1999

[54] BURST TRANSMISSION APPARATUS AND METHOD FOR AUDIO/VIDEO INFORMATION

[75] Inventor: Richard A. Lang, Cave Creek, Ariz.

[73] Assignee: Instant Video Technologies, Inc., San Francisco, Calif.

[ * ] Notice: This patent is subject to a terminal disclaimer.

[21] Appl. No.: 08/896,727

[22] Filed: Jul. 18, 1997

Related U.S. Application Data

[63] Continuation of application No. 08/624,958, Mar. 28, 1996, abandoned, which is a continuation of application No. 07/976,542, Nov. 16, 1992, abandoned, which is a division of application No. 07/775,182, Oct. 11, 1991, Pat. No. 5,164,839, which is a continuation-in-part of application No. 07/289,776, Dec. 27, 1988, Pat. No. 4,963,995.

[51] Int. Cl.⁶ .................................................. H04N 5/76
[52] U.S. Cl. ............................................. 386/46; 386/109
[58] Field of Search ............................. 386/46, 52, 101, 386/109, 96, 106, 112; 348/384; H04N 5/76

[56] References Cited

U.S. PATENT DOCUMENTS

| | | | |
|---|---|---|---|
| 2,987,614 | 6/1961 | Roberts et al. ............................. 250/6 |
| 4,179,709 | 12/1979 | Workman ............................... 353/133 |
| 4,300,161 | 11/1981 | Haskell ................................... 358/142 |
| 4,400,717 | 8/1983 | Southworth et al. ..................... 358/13 |
| 4,446,490 | 5/1984 | Hoshimi et al. .......................... 360/32 |
| 4,467,473 | 8/1984 | Arnon et al. ............................. 370/109 |
| 4,506,387 | 3/1985 | Walter ..................................... 455/612 |
| 4,511,934 | 4/1985 | Ohira et al. ............................... 360/55 |
| 4,516,156 | 5/1985 | Fabris et al. .............................. 358/85 |
| 4,521,806 | 6/1985 | Abraham ................................. 358/86 |
| 4,563,710 | 1/1986 | Baldwin .................................. 360/9.1 |
| 4,625,080 | 11/1986 | Scott ....................................... 379/104 |
| 4,654,484 | 3/1987 | Reiffel et al. ............................. 379/53 |
| 4,698,664 | 10/1987 | Nichols et al. ............................ 358/10 |
| 4,709,418 | 11/1987 | Fox et al. ................................. 455/612 |
| 4,724,491 | 2/1988 | Lambert ................................... 358/310 |
| 4,736,239 | 4/1988 | Sprague et al. ......................... 358/21 R |
| 4,743,959 | 5/1988 | Frederiksen ............................... 358/11 |
| 4,750,034 | 6/1988 | Lem ......................................... 358/84 |
| 4,768,110 | 8/1988 | Dunlap et al. ........................... 360/33.1 |
| 4,774,574 | 9/1988 | Daly et al. ............................... 358/133 |
| 4,785,349 | 11/1988 | Keith et al. .............................. 358/136 |
| 4,821,208 | 4/1989 | Ryan et al. ............................... 364/518 |
| 4,829,372 | 5/1989 | McCalley et al. .......................... 348/7 |
| 4,851,931 | 7/1989 | Parker et al. ............................. 360/15 |
| 4,868,653 | 9/1989 | Golin et al. .............................. 358/133 |
| 4,888,648 | 12/1989 | Takeuchi et al. ........................ 358/335 |
| 4,891,694 | 1/1990 | Way ........................................... 348/7 |
| 4,897,717 | 1/1990 | Hamilton ................................. 358/133 |
| 4,918,523 | 4/1990 | Simon et al. ............................ 358/133 |
| 4,920,432 | 4/1990 | Eggers et al. .............................. 348/8 |
| 4,941,054 | 7/1990 | Muramoto ............................... 358/310 |
| 4,943,865 | 7/1990 | Hales et al. .............................. 358/335 |
| 4,963,995 | 10/1990 | Lang ........................................ 358/335 |
| 4,974,178 | 11/1990 | Izeki et al. ............................... 364/523 |
| 4,987,552 | 1/1991 | Nakamura ............................... 358/335 |
| 5,006,936 | 4/1991 | Hooks, Jr. ................................ 358/335 |
| 5,057,932 | 10/1991 | Lang ........................................ 358/335 |
| 5,068,733 | 11/1991 | Bennett ....................................... 348/7 |
| 5,164,839 | 11/1992 | Lang ........................................ 358/335 |
| 5,220,420 | 6/1993 | Hoarty et al. ............................. 358/86 |

*Primary Examiner*—Huy Nguyen
*Attorney, Agent, or Firm*—Carr & Ferrell LLP

[57] ABSTRACT

An improved video recorder/transceiver with expanded functionality ("VCR-ET") including a capability for storing video and video programs in digital format, editing such programs, transferring such programs onto a hard copy magnetic media, and transmitting such programs to a remote location using a second VCR-ET. The increased functionality is realized through the use of analog to digital conversion, signal compression and intermediate storage in an integrated circuit, random access memory. The recorder/transmitter has capabilities to transmit and receive program information in either a compressed or decompressed format over fiber optic lines, conventional phone lines or microwaves.

24 Claims, 4 Drawing Sheets

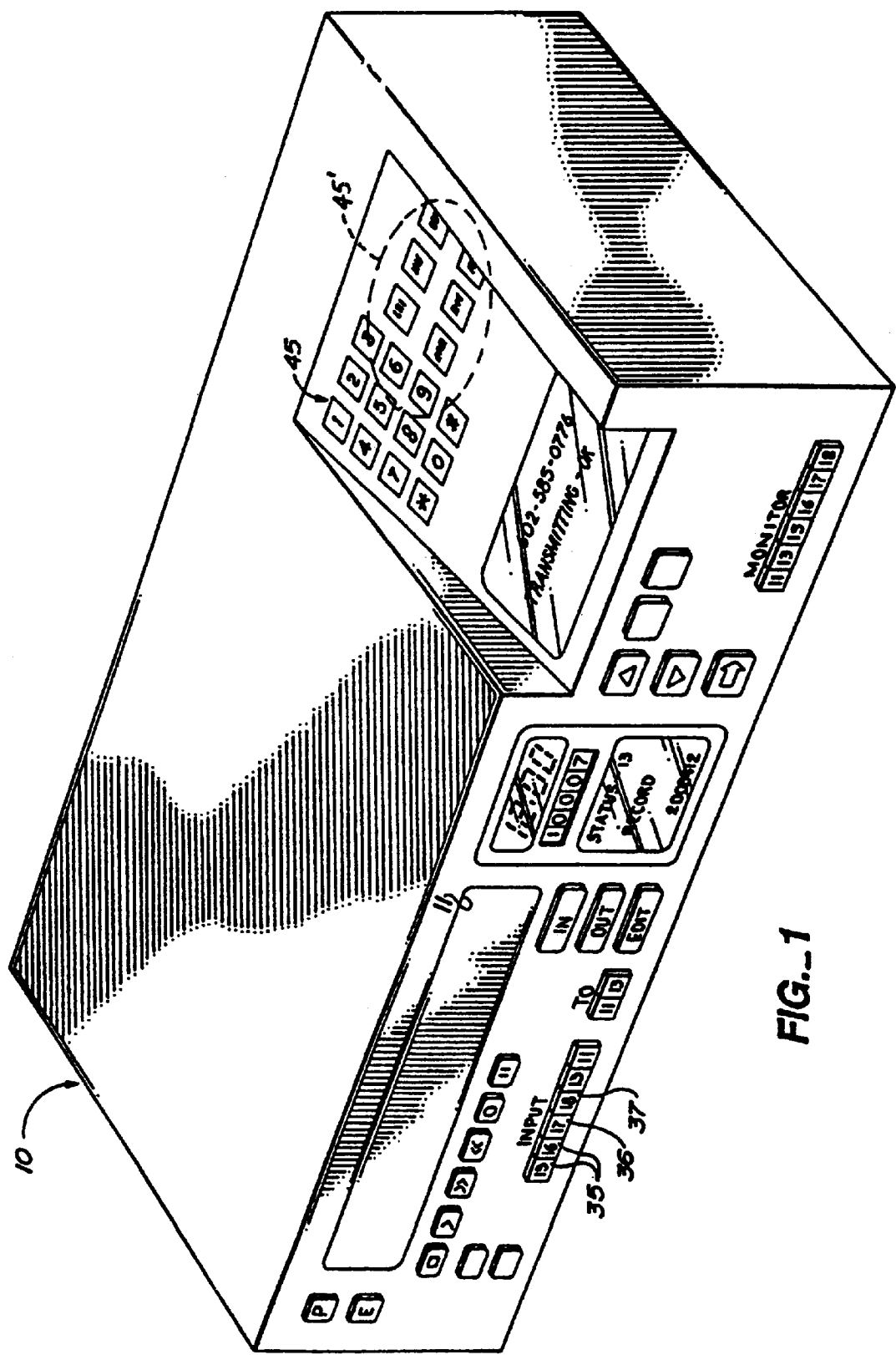
FIG._1

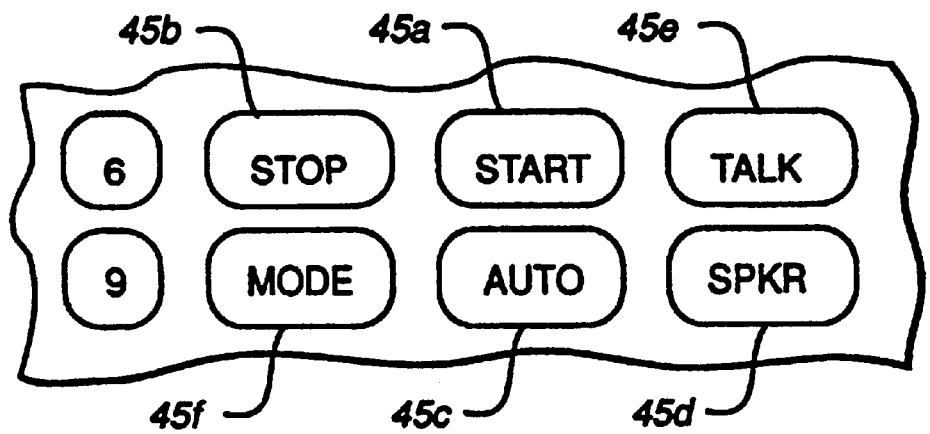
FIG._1A
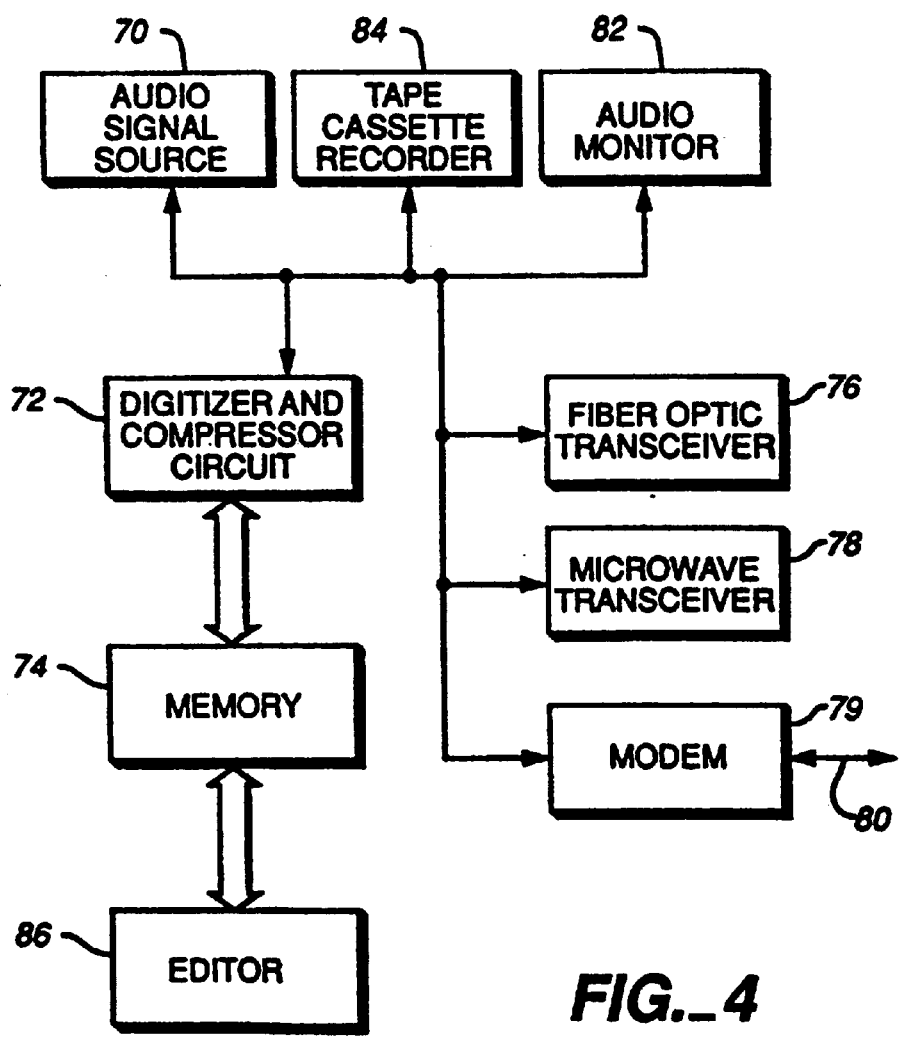
FIG._4

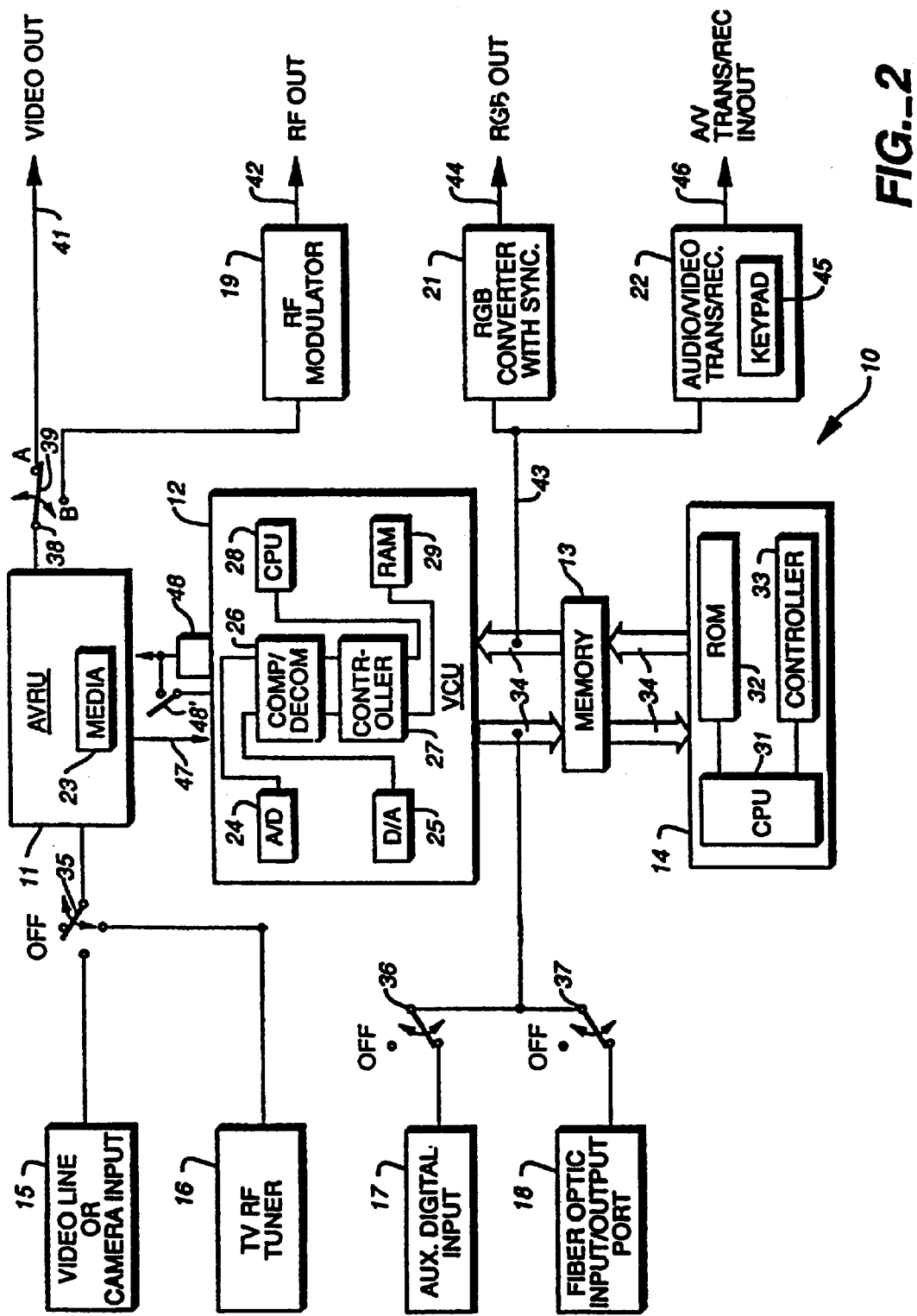
FIG._2

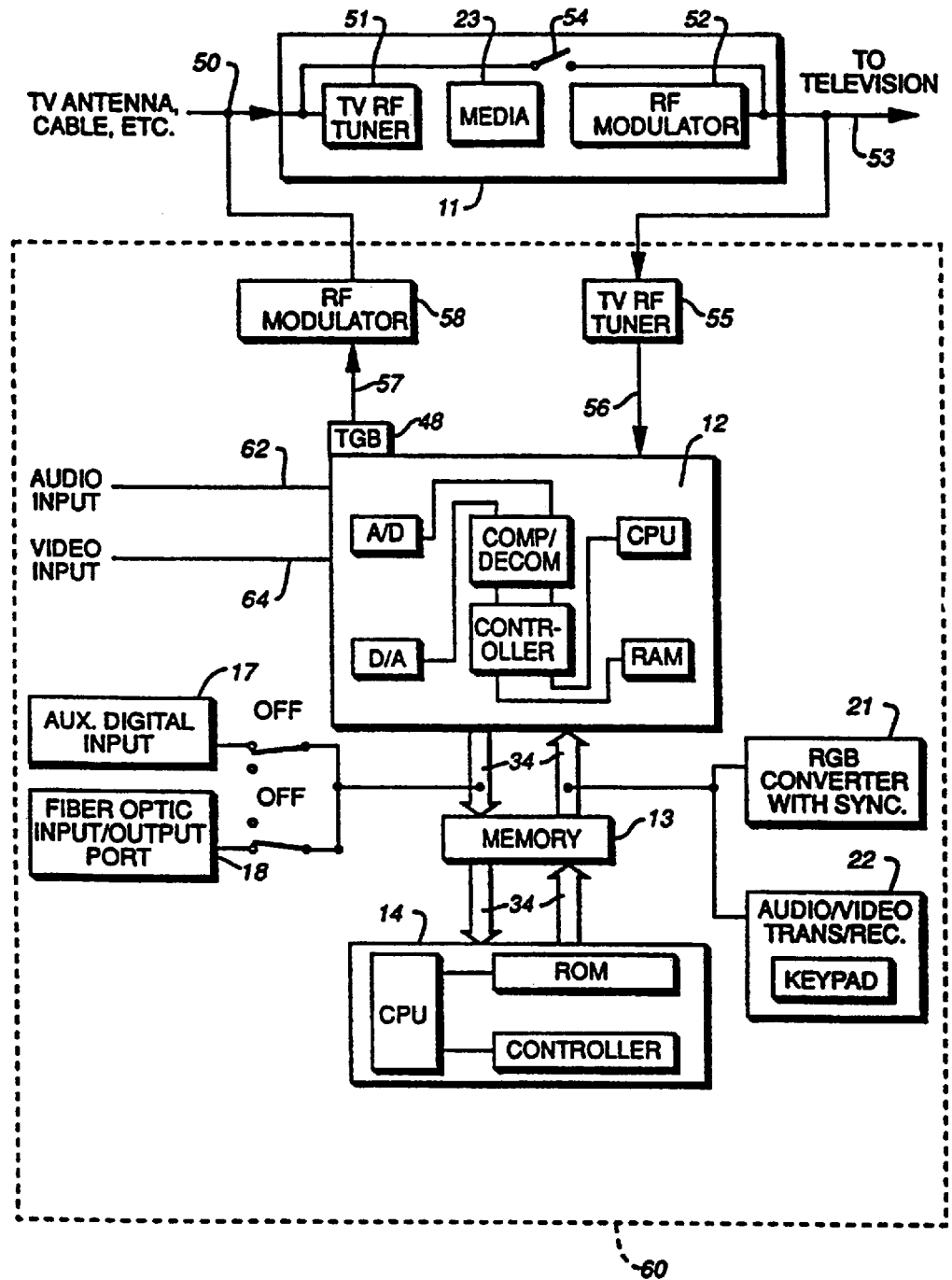
FIG._3

5,995,705

BURST TRANSMISSION APPARATUS AND METHOD FOR AUDIO/VIDEO INFORMATION

RELATED APPLICATIONS

This is a continuation of application Ser. No. 08/624,958 filed on Mar. 28, 1996 abandoned, which is a continuation of Ser. No. 07/976,542 filed Nov. 16, 1992, abandoned, which is a division of Ser. No. 07/775,182 filed Oct. 11, 1991, U.S. Pat. No. 5,164,839, which is a continuation-in-part of Ser. No. 07/289,776 filed Dec. 27, 1988, U.S. Pat. No. 4,963,995.

BACKGROUND OF THE INVENTION

The video cassette recorder (VCR) has added significantly to the usefulness of the home television set. Important or exceptionally good programs may be recorded to be viewed again. Programs appearing at times that are inconvenient for viewing may be recorded for playback at a later time. Recorded movies or other materials, educational or entertaining, may be rented or borrowed for viewing at home. (As used in the remainder of this specification, the term "program" encompasses movies and other types of video and/or audio materials, whether broadcast from a TV station or another source.)

The typical VCR has its own tuner-receiver and a video-recorder. It can receive and record a program from one channel while the television set is being employed to view a program on another channel. Programs are recorded on magnetic tape. The tape is then played back and viewed on the television set. Features commonly included in the VCR are capabilities for advancing the tape forward or backward at a high speed, stopping motion at any frame to hold the image, or simply playing back the recording at normal speed.

Desirable features that are not normally available in a VCR are capabilities for copying recorded programs from one tape or alternative storage medium to a similar or dissimilar storage medium, editing recorded programs and high speed recording. Another desirable, but currently unavailable, feature is the capability for high speed, high quality transmission and reception by optical fiber using the VCR.

DESCRIPTION OF THE PRIOR ART

U.S. Pat. No. 4,768,110, incorporated herein by reference, describes a VCR having two tape decks included therein. The purpose for the inclusion of two decks rather than the usual single tape deck is to permit the simultaneous viewing of a live RF-modulated TV signal or prerecorded material while recording another live RF-modulated TV signal and to also allow the copying of material from a first magnetic cassette tape onto a second magnetic cassette tape without the use of a second VCR. Viewing of the recorded material during the copying process is also possible in this arrangement. A major disadvantage is that the incorporation of the second tape deck is expensive and limited to magnetic tape, and furthermore, this prior art does not allow for the transmission or reception of recorded material over optical fibers or the high speed reception or transmission of audio/video material in a digital format. An additional disadvantage is the inability for random access editing of the audio/video signal. Furthermore, the additional mechanical structure adds significantly to the overall dimension of the equipment and increases the prospects of mechanical failures.

SUMMARY OF THE INVENTION

In accordance with the invention, an improved audio/video recorder is provided with added features and functions which significantly enhance its usefulness and functionality.

It is, therefore, an object of the present invention to provide an improved audio/video recorder for use in conjunction with an ordinary home television set.

Another object of the invention is to provide in such an improved audio/video recorder a capability for transferring a previously recorded program from one magnetic tape or other storage medium to another.

A further object of the invention is to provide such a capability for transferring a recorded audio/video program without resort to the use of two magnetic tape decks, this being a cumbersome, limited, and expensive approach already proposed in the prior art.

A still further object of the invention is to provide an effective and efficient means for intermediate storage of the audio/video program in digital memory as a means for achieving the transfer of the audio/video program from one tape or storage medium to another.

A still further object of the invention is to provide in such an improved audio/video recorder a capability for accepting various forms of analog or digital audio and video input signals and for converting the analog input signals to digital form when appropriate.

A still further object of the invention is to provide in such an improved audio/video recorder a capability for editing the video input signals without the necessity of using multiple cassettes or recording media.

A still further object of the invention is to provide an improved audio/video recorder for connection to various signal sources including a TV RF tuner, video camera, video and audio line input, and direct audio/video digital input from sources as diverse as a fiber optic input line, a microwave transceiver or a computer.

A still further object of the invention is to provide an improved audio/video recorder having a capability for mixing live audio/video programs with either analog or digital audio/video input signals from another source A still further object of the invention is to provide an improved audio/video recorder for simultaneously playing, viewing, recording and/or mixing digital and analog audio/video programs from different digital and analog audio/video sources or storage media.

A still further object of the invention is to provide an improved audio/video recorder which maximizes a given storage capacity, through the use of a data compression technique.

A still further object of the invention is to provide an audio/video recorder/transceiver utilizing a data compression technique for efficient storage of data, and efficient transmission and reception of a digitized audio/video program over a telephone line, a fiber optic cable, a microwave transceiver or other data transmission means.

A still further object of the invention is to provide in such an improved audio/video recorder a capability for delivering output signals in different forms or formats including a standard RF modulated output signal for viewing on a television set, a digital output signal for viewing on a high-resolution monitor, and audio output signals for a speaker system.

A still further object of this invention is to provide an improved audio/video recorder which provides for random access to any given segment of a self-stored audio/video program so that the desired segment may be accessed and viewed without the time-consuming delays normally involved in fast-forward or fast-reverse searching procedures employed in present state-of-the-art VCR's.

A still further object of the invention is to provide an improved audio/video recorder which provides convenience in the editing of stored data by virtue of its random access memory capability.

A still further object of the invention is to provide an improved audio-video recorder which has the potential for enhanced audio and video quality by virtue of its capability for digital audio/video output and digital filtering techniques, and image or audio processing.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which:

FIG. 1 is a perspective view of the housing of the audio/video recorder editor/transceiver ("VCR-ET") disclosed and embodying the invention;

FIG. 1A is an enlarged view of the circled area of FIG. 1;

FIG. 2 is a functional block diagram of the VCR-ET of FIG. 1;

FIG. 3 is a functional block diagram of a VCR-ET in accordance with another embodiment of the invention; and FIG. 4 is a functional block diagram of an audio recorder/transceiver constructed in accordance with the invention.

DESCRIPTION OF THE PREFERRED EMBODIMENT

Referring to the drawing by reference characters, FIGS. 1 and 2 illustrate an improved audio/video recorder editor/transceiver 10 (VCR-ET) comprising an audio/video recording unit (AVRU) 11, a video control unit (VCU) 12, memory 13, digital control unit (DCU) 14, video line or camera input line 15, TV RF tuner 16, auxiliary digital input port 17, fiber optic input/output port 18, RF modulator 19, RGB converter with synchronizer 21, and an audio/video transmitter/receiver 22 with keypad 45, all in a common housing.

The audio/video recording unit AVRU 11 may be a video cassette recorder similar to a conventional VCR in which the storage media 23 is a magnetic tape. Alternatively AVRU 11 may operate with other types of storage media including, but not limited to, other magnetic tape formats. AVRU 11 has all the functions of the typical VCR including record, play, rewind, slow motion, fast-forward and single frame hold.

An alternate form of storage media for use in AVRU 11 is the CD-ROM, which is a disk using a derivative of glass or plastic in conjunction with an aluminum or other metallic coating. Audio and video signals are stored in the form of irregularities in the aluminum coated surface and are read using a low power laser. In this case, the user would not be able to store or write on the CD-ROM, but would be able to play discs that have been recorded and distributed commercially. The storage of video and audio signals on the CD-ROM is in digital form which is readily accommodated by the video recorder of this invention.

Instead of using a CD-ROM, VCR-ET 10 can use optical discs as media 23. Such optical discs are similar to a CD-ROM and use a variable power laser to read from or write on the disc.

A first type of optical disc may comprise a WORM (Write Once Read Many) optical disc. This device has the unique capability of writing on the disc permanently. A laser is used to change the magnetic or optical properties of the media. A lower-powered laser is then used to read the data from the disc. Data, in this case, is permanently recorded; it may neither be erased nor written over. A further description of this technology can be found in the November 1988 issue of *The Electronic System Design* magazine (ESD) pages 55–56, incorporated herein by reference.

A second and preferred type of optical disc to be used in AVRU 11 is an erasable optical disc. This disc has full read/write/erase capabilities. With this disc, AVRU 11 has the same record/playback capabilities as a conventional VCR. As an example, erasable optical discs are used in Steven Jobs' "Next" machine as described in *Infoworld*, Volume 10, issue 42, pages 51 and 93, Oct. 17, 1988, incorporated herein by reference. In addition, the random access capabilities of the erasable disc (and of the CD-ROM and WORM) provide additional benefits as will be discussed in a later part of this specification.

A key element of VCR-ET 10, which is responsible for its improved functionality, is the video control unit or VCU 12. The VCU comprises an analog to digital converter (ADC) 24, a digital to analog converter (DAC) 25, a compressor/decompressor 26, a controller 27, a central processing unit (CPU) 28 and a random access memory (RAM) 29. VCU 12, using these elements, accomplishes the digitization and compression of analog signals as well as the reverse process in which the compressed digital signals are decompressed and converted back to analog signals.

As a first step in the processing of the composite video signals within VCU 12, the sync signals are decoded to isolate signals for each picture frame for processing.

The video signals defining each frame may then be converted to a red analog signal, a green analog signal, and a blue analog signal in a conventional manner. The red, green and blue analog signals are then converted to digital form by the analog to digital converter (ADC) 24. The frame is divided into a set of closely positioned rows and columns of picture elements or "pixels." Each pixel has a color defined by a set of three digital values defining strength of the primary color components, red, green and blue (RGB) respectively. In one embodiment, each frame is divided into an array of 300 by 300 pixels, with the color and luminance of each pixel being defined by a seven bit word for the red component, a seven bit word for the blue component, and a seven bit word for the green component. These words are generated by ADC 24. The RGB video signal may also be processed by means of hue-saturation-intensity (HSI) color processing, where appropriate, as described in "Chips for Real-Time Comparisons," *Electronic Engineering Times*, issue 525, Feb. 13, 1989, page 122.

If each frame includes 90,000 pixels (300×300), and each pixel is defined by 21 bits (7 bits per primary color), the digital representation of a single video frame utilizes a sizable block of digital information (i.e., 1.89 megabits/frame) which must be processed very rapidly. (Approximately 30 frames/second are received from AVRU 11.) Fortunately the analog to digital conversion of these signals may be accomplished at the desired speed using commercially available analog to digital converter integrated circuits. The analog to digital converter 24 (ADC) is a high-speed, high-accuracy, A to D "flash" converter available as a single IC (integrated circuit). Several different types of such A/D converters are available from Burr-Brown, one of which is the ADC 600. Part number TIC024, manufactured by Tektronix, Inc. is also appropriate. Other types of devices appropriate for this function are described in an article by K. Rogers entitled "8-bit A/D Flash Hits 500 Msamples", Electronic Engineering Times, Dec. 12, 1988, page 90, incorporated herein by reference.

Compression of the digital data defining a video frame and the reverse process (decompression) are accomplished by compressor/decompressor 26. Various algorithms may be employed in the compression process which enable the representation of a series of numbers by a reduced number of digits. As an example, compression algorithms like CCITT Group IV may be used.

In one optional embodiment, to further reduce the amount of memory required to store a program, the compression algorithm can simply record data corresponding to only those pixels which change color from one frame to the next. This results in considerable memory space savings, since not all pixels change color each frame. Basing calculation upon 10% of the pixels changing from one frame to the next, it is estimated that memory requirements using this technique are cut by about 90%. It is also estimated that on the average, the CCITT Group IV algorithm can cut memory requirements by another 95%. Thus, if no data compression technique is used, it would take approximately 51.03 gigabytes to store a 2 hour video program, but by using the above compression techniques, it is estimated that memory 13 will require only 250 megabytes.

Controller 27 handles timing and aids in the communication between the different elements of VCU 12, and between VCU 12, AVRU 11 and memory 13.

In one embodiment, the audio portion of the program is periodically sampled and digitized by analog to digital conversion. In one embodiment, this is done at a sample rate of 88,000/second, one byte per sample, to yield compact disc quality sound. The sampling rate could be dropped to reduce memory requirements. Also, the audio data can be compressed with conventional algorithms.

The process of converting either from analog to digital or from digital to analog requires memory for intermediate storage. Random Access Memory (RAM) 29 serves in this capacity. For this purpose either a DRAM (Dynamic RAM) or a SRAM (static RAM) may be employed. An example of a DRAM is the TI (Texas Instruments) TMX4C1024; an example of a SRAM is the INMOS IMS-1203. RAM 29 should have sufficient capacity to store at least two full uncompressed frames (e.g., about 472 KB).

The CPU (Central Processing Unit) 28 is a micro-processor which controls the digitization process of VCU 12. CPU 28 works with controller 27 to control and communicate with the other elements of the VCU. There are numerous commercially available microprocessors that are appropriate for this application. The Intel 80286, Intel 80386, Motorola 68020, and Motorola 68030 are examples. A more complete description of the microprocessors can be found in the Oct. 27, 1988 issue of *Electronic Design News* (EDN), pages 231 and 242, incorporated herein by reference, or in the applicable data sheets.

Controller 27, CPU 28 and RAM 29 serve in the same manner during the reverse processes, i.e., decompression and digital to analog conversion. Decompression is first accomplished in compressor/decompressor 26. The decompressed digital signal is then converted to an analog signal by digital to analog converter (DAC) 24 (assuming its destination requires an analog form). In the course of converting the decompressed signals from the VCU 12 for use by the AVRU 11 the signals are synchronized by the time base generator (TBG) or corrector 48. TBG generator 48 inserts synchronization pulses into the signal provided by VCU 12 to identify individual raster scan lines and frames so that the resulting signal can be used by a conventional television set or VCR. TBG 48 can be bypassed by shunt switch 48' for the purpose of transmitting either compressed or decompressed signals from VCU 12 directly to the AVRU 11 in an uncorrected time based mode.

DAC 25 provides the inverse of the function performed by A/D converter 24. DAC 25 is a high-speed, high accuracy digital to analog converter. An example of such a converter is the Burr-Brown DAC60 digital to analog converter.

Different types of memory technologies are adaptable for use in memory 13. As mentioned earlier, DRAM and SRAM semiconductor memories are commonly used for applications of this type and are readily available.

One type of random access memory is CMOS (Complimentary Metal Oxide Semiconductor). The CMOS memory has the advantage of a relatively low power requirement and is readily adaptable for use of battery backup for semi-permanent data storage. Other types of memory include the above mentioned optical disc memories, bubble memories and magnetic disks. Another appropriate data storage media may be "Digital Paper" available from ICI Image data of Wilmington, Del.

Emerging memory technologies may also prove advantageous with capabilities for mass data storage in even smaller physical dimensions.

Digital Control Unit (DCU) 14 comprises a CPU (Central Processor Unit) 31, a ROM (Read Only Memory) 32 and a controller 32. DCU 14 is responsible for all of the digital editing processes. Through the use of DCU 14, video segments may be edited and rearranged. Thus, one may use DCU 14 to rearrange the scenes in a program, alter the program sound track, etc.

In addition, a program may be edited, one frame at a time, by changing the contrast, brightness, sharpness, colors, etc. (Alteration of the contrast, brightness, sharpness and colors can be automated as well.) In one embodiment, images can be rotated, scaled (i.e., made larger or smaller), etc. In addition, pixel by pixel editing can be accomplished by DCU 14, e.g., in a manner similar to a PC paint program. Similar editing features can be incorporated for the audio portion of each program. In one embodiment, a display such as a flat panel video display (not shown) is built into the VCR-ET. A user interface control panel of DCU 14 allows a user to select a desired frame number from a menu on the display. The VCR-ET then displays a strip of frames (including several frames before and after the selected frame). The user can delete frames in a strip, select a point where other frames are to be inserted into the program, or edit different frames (i.e., alter contrast, brightness, sharpness, colors, etc.). In one embodiment, a user input device such as a light pen or mouse can be used to select individual frames in a strip for editing.

Instead of incorporating a flat display into VCR-ET 10, in another embodiment, a television coupled to output lead 42 of RF modulator 19 can be used during editing.

CPU 31 is a microprocessor of the type described in connection with the CPU 28 of VCU 12. Controller 33 is an integrated circuit which handles the timing and interfacing between DCU 14 and memory 13. ROM 32 holds the necessary step-by-step editing programs which are installed at the factory. A currently available example of a suitable ROM for this application is the Texas Instruments part TMS47256. CPU 31 and controller 33 together control the editing process as they execute the programs stored in ROM 32.

The VCU 12, memory 13 and DCU 14 communicate with each other via a high speed data bus 34. The high speed data bus is required in order to meet bandwidth requirements. Examples of suitable data bus devices are Motorola's VME bus, Intel's Multibus and the Optobuss (U.S. Pat. No. 4,732,446).

A video line or camera input line 15 is provided to enable VCR-ET 10 to receive an input signal from a source such as a television camera, a conventional VCR, a television tuner, or another VCR, etc. The signals received at input line 15 are typically carried by a coaxial cable and are in the form of a standard television composite signal. As used throughout this specification, the words "standard television composite signal" or its acronym STCS shall be read to include any one of the following: NTSC, PAL, SECAM, HDTV, or any American or European broadcast signal standards. (NTSC, PAL and SECAM are discussed in "Reference Data for Radio Engineers", published by Howard W. Sams & Co. in 1983, incorporated herein by reference.) An NTSC composite signal is defined as the analog signal that carries the chrominance (color), luminance (brightness), synchronization (timing) and audio signals that make up the video signals received and displayed by television and video cassette recorders. These four components are combined into one signal by modulating the components in different ways. (Amplitude modulation and phase modulation are examples.) The standard video line signal is such a composite signal and may be received at input line 15 from one of the above-mentioned sources.

TV RF tuner input port 16 also supplies a composite signal as described in regard to video input line 15. The difference is that this signal is received from an antenna or cable TV coaxial cable. To receive such a signal, tuner 16 is capable of being set or tuned to receive the desired carrier frequency or television channel.

Selector switch 35 is provided to select either video input line 15 or TV RF tuner 16 as an input signal source to AVRU 11.

Auxiliary digital input port 17 is employed to receive any acceptable digital signal such as computer-generated video signal or as may be supplied by another VCR-ET. This signal, for example, may be an RGB video signal such as that delivered to computer monitors, or it may be a digitized audio signal. (As mentioned above, an RGB signal is a signal which communicates the strength of the red, green and blue color components for the pixels that make up each video frame.) Switch 36 selects whether the digital video/audio input signal is chosen from auxiliary digital input port 17. Switch 36 supplies the selected signal to high speed data bus 34 which carries the signals in digital form.

Fiber optic port 18 incorporates a fiber optic transceiver. Port 18 has a capability for transforming fiber optic (light) signals to electrical signals or for transforming electrical signals to fiber optic signals. Port 18 thus provides a capability for two-way communication between high speed data bus 34 and a fiber optic signal line. The incorporation of fiber optic port 18 in the VCR-ET provides a capability for receiving audio/video signals from or delivering audio/video signals to the fiber optic line such as a fiber optic telephone line. The fiber optic line carries digital signals in the form of light waves over great distances with a high degree of accuracy and reliability and at a high speed (e.g., about 200 megabytes/second). The VCR-ET can receive/transmit a video program at an accelerated rate via fiber optic port 18 from/to a variety of sources. For example a video program may be communicated at an accelerated rate from the first VCR-ET to a second VCR-ET in less time than it would take to view the program. Thus, it is not necessary to access the optical fiber for long periods of time in order to transmit a long video program.

It is also envisioned that in the future, a video library may be established which downloads video programs at an accelerated rate via optical fibers to a subscriber's VCR-ET. After downloading, the program may be viewed, stored in memory, edited and/or a hard copy of the program may be made on magnetic tape, optical disk, etc.

Switch 37 is provided to select connection to the fiber optic input/output port 18. An OFF or open position is provided. The selected signal is delivered to or supplied from high speed data bus 34.

Analog output signals from AVRU 11 are delivered to the common terminal 38 of a selector switch 39. When set to position A, switch 39 delivers the output signal of AVRU 11 directly to a video output line 41 as a standard STCS composite signal; when set to position B switch 39 delivers the output of VRU 11 to the input of RF modulator 19. Modulator 19 converts the video signal to an RF-modulated composite signal for delivery to such devices as televisions and conventional VCR's. These types of devices play back the video program on a particular frequency channel (such as channel 4) on the television. Delivery to the television or VCR is via RF output line 42.

Digital output signals from VCR-ET 10 may be dispatched from high speed data bus 34 via line 43 to input leads of RGB converter 21 and audio/video transmitter/receiver 22.

RGB converter 21 converts the STCS signal into an RGB signal as required by computer monitors and similar display devices. The converted signal is received by a display device connected to RGB converter output line 44.

VCR-ET 10 includes audio/video transmitter/receiver 22 which is typically a built-in modem. Advantageously, the modem may be used to communicate an audio/video program over conventional phone lines in a manner similar to that described above with respect to optical fibers. The term modem is derived directly from its functionality as a modulator-demodulator which allows transfer of the audio/video signal in a digital format over the standard telephone line. Modems are commonly available for computers and are currently available in the form of a single integrated circuit. As an example, Sierra Semiconductor offers a 2400 baud single chip modem under its part number SC111006. Representative manufacturers of these single modem IC's can be found in the Apr. 14, 1988 issue of Engineering Design News (EDN), pages 124–125. Some of these single IC modems have the added capability of generating the tones for dialing a phone number. The destination phone number may be entered by means of an optional keyboard/keypad 45 incorporated in the video recorder 10 of the invention. Output port 46 of transmitter/receiver 22 connects directly to the telephone line.

Also associated with Modem 22 is an auxilliary keyboard 45' (FIG. 1A) of buttons for commanding the modem to perform tasks such as starting a transmission over phone lines (45a), terminating a transmission (45b), automatic telephone answering to receive transmissions (45c), using an optional speaker (not shown) to monitor phone lines (45d), using an optional microphone (not shown) to speak over the phone lines (45e) and for controlling the baud rate (45f).

The application and utilization of the VCR-ET may include a number of forms or operating modes. In its first and simplest operating mode, AVRU 11 may be operated in the manner of a conventional VCR with signals from an antenna being received by tuner 16 and recorded directly on media 23 in analog form. At the same time the received program may be viewed on the television screen with the television connected at video output terminal 42. An optional signal source for this type of operation is the video line or camera input line 15 selectable by switch 35.

In a second operating mode a program stored in media 23 of AVRU 11 may be played back and viewed on the connected television set.

When it is desired to copy a program from one recording media to another, the recording media holding the desired program is installed in the AVRU. The recording media is then played back with optional viewing on a connected television set or other TV monitor or listening through speakers (as appropriate). As the recording media is played back, the analog signals from the recording media (video and/or audio) are dispatched to VCU 12 via connection 47. The analog signals are converted to digital signals by ADC 24, compressed by compressor/decompressor 26 and the compressed digital signals are stored in memory 13. The foregoing operations are accomplished under the control of controller 27 and CPU 28. RAM 29 is used for interim data storage during this process. Once the complete video/audio program has been stored in memory 13, the recording media from which the stored program has just been read is replaced by blank recording media upon which the stored program is to be copied. CPU 28 in cooperation with controller 27 and RAM 29 then executes the decompression and digital to analog conversion of the program stored in memory 13, decompression taking place in compressor/decompressor 26, and digital to analog conversion being accomplished by DAC 25. The resulting analog program is stored on the blank recording media which constitutes media 23 of AVRU 11.

In an alternate mode of operation, the decompression circuitry of VCU 12 can be bypassed. Thus, a user has the option of downloading the stored program from memory 13 onto recording media 23 in compressed digital format. The user can then reload the program from media 23 into memory 13 at a future time for viewing, editing or recording back onto recording media 23 in analog form. This capability allows the user to quickly clear memory 13 for other interim uses and also provides the user with a hard copy of the program in digital format. The hard copy in compressed digital format has a number of uses, e.g. it could be archived for later viewing, transmitted by an appropriate independent transmitter, etc.

During the foregoing procedures, DCU 14 may be utilized for editing operations. As the program is being read from the first or original recording media, it is simultaneously viewed on the TV screen, or listened to by means of an audio monitor, converted to digital signals, compressed and stored in memory 13. Once the digital audio/video program is stored in memory 13, editing is accomplished by the user through control of DCU 14, by means of a control panel (not shown) coupled to DCU 14. If desired, additional audio/video signals may be simultaneously entered into memory 13 and added to those received from VCU 12. The additional signals may be introduced from auxiliary digital input port 17 or from fiber optic input/output port 18 and may comprise video captions for super imposed position upon the stored video images, or they may be audio commentaries to be added to silent video presentations. In addition, as mentioned above, the order in which various segments appear in the video programs may be altered. Certain undesired segments, such as TV commercials, may be removed. This editing operation is accomplished under the control of DCU 14.

In still another operating mode, a program stored in media 23 of AVRU 11 or being received by AVRU 11 from input line 15 (as from a video camera) may be digitized and compressed by VCU-12 and routed via bus 34, to memory 13. The data from memory 13 is then routed to line 43, transmitter/receiver 22 and to a telephone line. At the other end of the telephone line the signals received are processed by another VCR-ET.

Once received in the second VCR-ET's memory 13, the digitized program can then either be viewed directly from memory or transferred to storage medium 23, either in its entirety or in random segments, based on user preference.

In the case of video camera input at input 15 the transmitted signals may comprise a live transmission. Alternatively the transmitted program may be derived from a program stored in media 23 of AVRU 11. In this case the stored analog program is again decoded, digitized, compressed and transmitted via bus 34 to memory 13. The data in memory 13 is then communicated via line 43 and transmitter/receiver 22 to telephone lines.

It follows, of course, that digitized video and audio signals from the remote VCR-ET at the other end of the telephone line may be received at line 46, entered into memory 13 via transmitter/receiver 22, converted to analog signals by VCU 12, and recorded on media 23 and then viewed, if desired, on a television set connected at output 42. A hard copy of the program may also be made for later viewing.

As mentioned earlier, when any of the foregoing operations entail the processing of unmodulated video signals, such signals must first be processed by RF modulator 19 before they can be accepted by devices such as a conventional VCR or television set; when the monitoring means is a computer monitor or a similar display device the signals are processed by RGB converter 21.

All of the foregoing operations are performed with enhanded quality and efficiency by virtue of the digital, rather than analog, storage and transmission modes and the compressed data storage mechanism, with additional advantages of improved cost and reliability afforded in the case of tape to tape (or other media to media) program transfers by virtue of the requirement for only a single tape deck or other storage device.

FIG. 3 illustrates an alternative embodiment invention in which AVRU 11 is not integral with VCU 12, memory 13 or editor 14. In this embodiment, AVRU 11 is a conventional, commercially available VCR which receives a modulated video input signal on an input cable 50. In this embodiment AVRU 11 includes a RF tuner 51 for demodulating the input signal so it can be stored in media 23. AVRU 11 also includes a RF modulator 52 for modulating the signal received from media 23 and providing the RF modulated output signal on an output cable 53, which can be coupled to a television set. (TV RF tuner 51 and RF modulator 52 are provided in typical commercially available VCR's.) A switch 54 is provided to couple input cable 50 to output cable 53 when media 23 is not serving as a video signal source. The VCR-ET of this embodiment includes a TV RF tuner 55 which receives and demodulates the signal on cable 53, and provides the resultant analog audio/video signal on a lead 56, which is digitized and compressed as described above. In this alternative embodiment, the digitized compressed signal may be processed as described above, e.g. stored in memory 13 (via high speed bus 34), edited, transmitted by the fiber optic port 18 to another VCR-ET, etc. When it is desired to view a program stored in memory 13, data from memory 13 is decompressed and converted to an analog signal by VCU 12, and the resulting signal is provided on an output lead 57 to a RF modulator 58, which modulates the video signal so that it can be received and stored by AVRU 11 or viewed on a television coupled to cable 53. (As mentioned above, in the FIG. 3 embodiment, AVRU 11 is a conventional VCR.)

One advantage of the embodiment of FIG. 3 is that many people already own VCR's. Rather than buying apparatus which duplicates much of the hardware already present in their VCR, the embodiment of FIG. 3 would provide to owners of conventional VCR's capabilities which are otherwise currently unavailable in an economical manner.

In one embodiment, analog auxiliary audio and video input terminals 62, 64 are provided so that analog signals may be provided by alternate sources to VCU 12.

The embodiments described above include means for transmitting/receiving video programs over fiber optic cables. However, in an alternative embodiment, either in place of fiber optic port 18 or in addition to fiber optic port 18, means are provided for transmitting and/or receiving a video program via microwave. In conventional microwave technology, satellite systems and microwave transmitters transmit data using a low power/high frequency signal. In an embodiment of the invention designed to receive microwaves, the VCR-ET includes an amplifier for amplifying the microwave signal and a demodulator for obtaining the video program signal from the microwave signal. Receiving, amplifying and demodulating the microwave signal can be accomplished with conventional microwave transceiver equipment. The video program signal is typically in digital form, and may be stored, viewed or edited as in the above-described embodiments. Program data from memory 13 can also be transmitted by the microwave transciever, thereby providing the capability for microwave transmission of stored video programs in compressed digital format. Thus, the invention can be used to receive and transmit programs via microwaves at an accelerated rate similar to and at least as fast as, the transmission and reception of programs over optical fibers. This feature allows transmission and reception of programs in a few minutes or seconds using currently available technology. Both point-to-point microwave transceivers and satellite transceivers may be used.

The embodiments described include means for receiving, storing and transmitting both audio and video signals. However, the invention encompasses apparatus which can store and transmit video signals only and apparatus which can store and transmit audio signals only. An embodiment designed to store and compress audio signals is illustrated in FIG. 4. Referring to FIG. 4, an audio signal source 70 (a tape recorder, microphone, record player, etc.) is coupled to a digitizer and compressor circuit 72, which converts the analog signal to a digital signal and compresses the digital signal in a manner similar to VCU 12 described above. The digital compressed signal can then be stored in a memory 74. Of importance, data from memory 74 can be transmitted by a fiber optic transceiver 76, or by a microwave transceiver 78 at an accelerated rate. This is important not only in a home entertainment application, but in other applications as well. For example, a user can dictate an audio presentation and send it to a remote location (e.g. an office) at an accelerated rate without having to monopolize the transmission medium (e.g. the fiber optic cable) for an extended length of time.

The business uses of the embodiment illustrated in FIG. 4 makes home offices feasible for many workers now confined to more traditional offices and also opens new possibilities to business people who are traveling.

In the embodiment of FIG. 4, data can also be loaded from memory 74, via a modem 79 over a conventional phone line 80. Data can also be received from phone line 80, fiber optic transceiver 76 or microwave transceiver 78, loaded into memory 74, and converted to an analog signal by circuit 72, to be listened to via an audio monitor 82, or to be stored on an audio tape cassette 84 or other storage media.

An editor 86 is optionally provided so that the data in memory 74 may be edited, e.g., by rearranging the order of portions of the audio program, increasing or decreasing the volume of portions (or different frequency components) of audio program, or enhancing the audio program through filtering techniques (e.g. to remove static and noise).

An improved audio/video recorder with significantly expanded functional capabilities is thus provided in accordance with the stated objects of the invention and although but a single embodiment of the invention has been illustrated and described, it will be apparent to those skilled in the art that various changes and modifications may be made therein without departing from the spirit of the invention or from the scope of the appended claim. For example, the VCR-ET can be constructed so as to be portable. Thus, it could be carried to a location where it is desired to record a program, and used to edit the program after it is recorded with a video camera. Other modifications will be apparent to those skilled in the art in light of the present specification.

What is claimed is:

1. An audio/video transceiver apparatus comprising:

input means for receiving audio/video source information, said audio/video source information comprising a multiplicity of video frames collectively representing at least one full motion video program;

compression means, coupled to said input means, for compressing said audio/video source information into a digital time compressed representation thereof, wherein said digital time compressed representation of said audio/video source information is capable of being transmitted in a burst transmission time period that is substantially shorter than a time period associated with real time viewing by a receiver of said audio/video source information;

storage means, coupled to said compression means, for storing said digital time compressed representation of said audio/video source information; and transmission means, coupled to said storage means, for transmitting said digital time compressed representation of said audio/video source information away from said audio/video transceiver apparatus in said burst transmission time period.

2. The audio/video transceiver apparatus of claim 1, further comprising editing means, coupled to said storage means, for editing the digital time compressed representation of said audio/video source information stored in said storage means and for storing the edited digital time compressed representation of said audio/video source information in said storage means.

3. The audio/video transceiver apparatus of claim 2, wherein said transmission means is configured to receive the edited digital time compressed representation of said audio/video source information and to transmit the edited digital time compressed representation of said audio/video source information away from said audio/video transceiver apparatus in said burst transmission time period.

4. The audio/video transceiver apparatus of claim 1, further comprising:
  decompression means, coupled to said storage means, for selectively decompressing the digital time compressed representation of said audio/video source information stored in said storage means; and
  editing means, coupled to said decompression means and said storage means, for editing the decompressed digital time compressed representation of said audio/video source information, and for then storing the edited decompressed digital time compressed representation of said audio/video source information in said storage means.

5. The audio/video transceiver apparatus of claim 1, wherein said input means comprise analog to digital converter means for converting analog audio/video source information received at said input means to corresponding digital audio/video source information.

6. An audio/video information transfer network comprising a plurality of audio/video transceivers coupled via at least one communication link, each of the audio/video transceivers comprising:
  input means for receiving audio/video source information, said audio/video source information comprising a multiplicity of video frames collectively representing at least one full motion video program;
  compression means, coupled to said input means, for compressing said audio/video source information into a digital time compressed representation thereof, wherein said digital time compressed representation of said audio/video source information is capable of being transmitted in a burst transmission time period that is substantially shorter than a time period associated with real time viewing by a receiver of said audio/video source information;
  storage means, coupled to said compression means, for storing said digital time compressed representation of said audio/video source information; and
  transmission means, coupled to said storage means, for transmitting said digital time compressed representation of said audio/video source information away from said audio/video transceiver apparatus in said burst transmission time period.

7. The audio/video transfer network of claim 6, wherein:
  said input means of at least one of said plurality of audio/video transceivers includes a fiber optic input port;
  said transmission means of at least one other of said plurality of audio/video transceivers includes a fiber optic output port; and
  said at least one communication link includes a fiber optic transmission line coupling in communication said fiber optic input port with said fiber optic output port.

8. The audio/video transfer network of claim 6, wherein said transmission means of at least one of said plurality of audio/video transceivers includes a modem, and said at least one communication link includes a telephone transmission line.

9. The audio/video transfer network of claim 6, wherein at least one of said audio/video transceivers further comprises editing means, coupled to said storage means, for editing the digital time compressed representation of said audio/video source information stored in said storage means and for storing the edited digital time compressed representation of said audio/video source information in said storage means.

10. The audio/video transfer network of claim 6, wherein at least one of said audio/video transceivers further comprises:
  decompression means, coupled to said storage means, for selectively decompressing the digital time compressed representation of said audio/video source information stored in said storage means; and
  editing means, coupled to said decompression means and said storage means, for editing the decompressed digital time compressed representation of said audio/video source information, and for then storing the edited decompressed digital time compressed representation of said audio/video source information in said storage means.

11. The audio/video transceiver network of claim 6, wherein at least one of said plurality of audio/video transceivers further comprises analog to digital converter means for converting analog audio/video source information received at said input means to corresponding digital audio/video source information.

12. A method for handling audio/video source information, the method comprising the steps of:
  receiving audio/video source information, said audio/video source information comprising a multiplicity of video frames collectively constituting at least one full motion video program;
  compressing the received audio/video source information into a digital time compressed representation thereof, the digital time compressed representation of said audio/video source information having an associated burst transmission time period that is substantially shorter than a time period associated with real time viewing by a receiver of said audio/video source information;
  storing the digital time compressed representation of said audio/video source information; and
  transmitting, in said burst transmission time period, the stored digital time compressed representation of said audio/video source information to a selected destination.

13. The method of claim 12, further comprising the steps of:
  editing the stored time compressed representation of said audio/video source information; and
  storing the edited time compressed representation of said audio/video source information.

14. The method of claim 12, further comprising the step of converting the received audio/video information from an analog format to a digital format.

15. The method of claim 12 wherein the step of transmitting the stored digital time compressed video information further comprises sending said time compressed data to one of a plurality of audio/video transceivers connected over at least one communications link.

16. The method of claim 15 wherein said at least one communications link comprises an optical channel.

17. The method of claim 15, wherein said at least one communications link comprises a telephone transmission channel.

18. The method of claim 12, further comprising the step of providing a network that includes a plurality of audio/ video transceivers, coupled via at least one communications link, said selected destination comprising at least one of said plurality of audio/video transceivers.

19. The method of claim 18, wherein said at least one communications link comprises an optical channel.

20. The method of claim 18, wherein said at least one communications link comprises a telephone transmission channel.

21. A method for handling audio/video source information, the method comprising the steps of:

receiving audio/video source information as a digital time compressed representation thereof, said audio/video source information comprising a multiplicity of video frames collectively constituting at least one full motion video program selected from a video library storing a plurality of video programs in a digital time compressed representation thereof for selective retrieval;

said at least one video program being received by a receiver in a burst transmission time period that is substantially shorter than a time period associated with real-time viewing by a receiver of said at least one video program;

storing the digital time compressed representation of said audio/video source information; and transmitting, in said burst transmission time period, the stored digital time compressed representation of said audio/video source information to a selected destination.

22. The method of claim 21, further comprising the step of providing a network that includes a plurality of audio/video transceivers, coupled via at least one communications link, said selected destination comprising at least one of said plurality of audio/video transceivers.

23. The method of claim 22, wherein said at least one communications link comprises an optical channel.

24. The method of claim 22, wherein said at least one communications link comprises a telephone transmission channel.

* * * * *

UNITED STATES PATENT AND TRADEMARK OFFICE
CERTIFICATE OF CORRECTION

PATENT NO. : 5,995,705  
DATED : November 30, 1999  
INVENTOR(S) : Richard Lang

Page 1 of 1

It is certified that error appears in the above-identified patent and that said Letters Patent is hereby corrected as shown below:

<u>Title page,</u>
Related U.S. Application Data, should read as follows:
-- [63] Continuation of application No. 08/624,958, filed March 28, 1996, now abandoned, which is a continuation of application No. 07/976,542, filed Nov. 16, 1992, now abandoned, which is a division of application No. 07/775,182, filed November 11, 1991, now Pat. No. 5,164,839, which is a division of application No. 07/347,629, filed May 5, 1989, now Pat. No. 5,057,932, which is a continuation-in-part of application No. 07/289,776, filed December 27, 1988, now Pat. No. 4,963,995.

Signed and Sealed this

Thirtieth Day of April, 2002

*Attest:*

*Attesting Officer*

JAMES E. ROGAN  
*Director of the United States Patent and Trademark Office*